United States Patent [19]

Halpern

[11] 4,338,246

[45] Jul. 6, 1982

[54] INTUMESCENT FLAME RETARDANT THERMOPLASTIC POLYMETHACRYLATE COMPOSITIONS

[75] Inventor: Yuval Halpern, Skokie, Ill.

[73] Assignee: Borg-Warner Chemicals, Inc., Parkersburg, W. Va.

[21] Appl. No.: 295,163

[22] Filed: Aug. 21, 1981

[51] Int. Cl.³ .............................. C08K 3/32; C08J 9/00
[52] U.S. Cl. ............................ 524/100; 260/DIG. 24; 521/85; 521/90; 521/149; 521/907
[58] Field of Search ............... 260/45.8 NE, 45.8 NT, 260/45.95 L, DIG. 24; 521/85, 149

[56] References Cited

U.S. PATENT DOCUMENTS 4,201,705  5/1980  Halpern ................... 260/45.8 NT

*Primary Examiner*—Morton Foelak
*Attorney, Agent, or Firm*—Richard J. Schlott

[57] ABSTRACT

Thermoplastic polymethacrylate compositions comprising (a) thermoplastic polymethacrylate such as polymethyl methacrylate, a pentate salt of an amino-s-triazine, and optionally a polyol are flame retardant and intumescent and may be compounded to be self-extinguishing.

6 Claims, No Drawings

INTUMESCENT FLAME RETARDANT THERMOPLASTIC POLYMETHACRYLATE COMPOSITIONS

BACKGROUND OF THE INVENTION

This invention relates to flame retardant polymethacrylate compositions. More particularly, this invention relates to flame retardant thermoplastic polymethacrylate compositions comprising a thermoplastic polymethacrylate and a flame retrading amount of the pentate salt of an amino-s-triazine and to a method for rendering thermoplastic polymethacrylates flame retardant.

Methacrylic polymers and copolymers are widely employed in a variety of applications such as for making injection molded parts and in forming fiber, film and sheet materials. The ready processability and weatherability has been a major factor in their wide acceptance. Thermoplastic polymethacrylate resins are, however, generally regarded as flammable, with UL94 NVE burning properties. The use of additive flame retardants is therefore indicated where flame retardant properties are required.

Flame retarded polymethacrylate compositions containing halogen-phosphorus compounds or phosphorus compounds which exhibit self-extinguishing, UL V-O characteristics are well known. For some applications the use of halogen-phosphorus compounds or phosphorusbased additive flame retardants is not desirable. Many phosphorus compounds, for example, tend to plasticize polymers and alter the physical properties. Similarly, halogen-phosphorus based flame retardants, whether used alone or in conjunction with synergists such as antimony oxides may alter key physical properties of the resin and limit the potential end uses. An alternative flame retardant for use in these resins would thus broaden the choices available to the resin compounder for meeting the demands of the market.

SUMMARY OF THE INVENTION

The pentate salts of amino-s-triazines are effective intumescent flame retardant additives for thermoplastic polymethacrylates providing compositions that are self-extinguishing and intumescent. The additives are dry, white, powdery solids and are readily compounded with polymethacrylates to provide compositions which have excellent color and which are readily processed without apparent foaming or decomposition during molding.

DETAILED DESCRIPTION OF THE INVENTION

The flame retardant polymethacrylate compositions of this invention comprise a thermoplastic polymethacrylate and a flame retarding amount of a pentate salt of an amino-s-triazine.

The polymethacrylates useful for the purposes of this invention are the polymers and copolymers of lower alkyl esters of methacrylic acid such as, for example, polymethyl methacrylate, polyethyl methacrylate, polybutyl methacrylate and the like, as well as copolymers and blends thereof.

The polymethacrylates are commercially available in a wide range of molecular weights and densities, and in general all will be useful for forming the flame retardant compositions of this invention.

The pentate salts of amino-s-triazines useful for the purposes of this invention are pentaerythritol diphosphate salts (pentates) having the following structure:

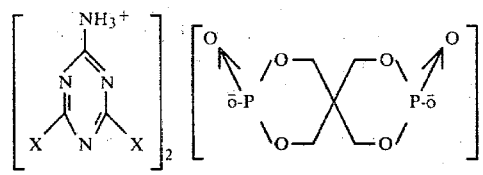

wherein x may be $—NH_2$ or $—OH$, and include melammonium pentate, ($x=—NH_2$), the pentate salt of ammelide ($x=—OH$), and mixtures thereof.

The pentate salts of amino-s-triazines are readily prepared by first hydrolyzing a pentate compound such as dichloropentate to provide the free acid, then reacting that product with the requisite amount of the amino-s-triazine to form the sparingly soluble salt. For example, the dichloropentate is first hydrolyzed by warming with aqueous alkali. This product is then added to a warm aqueous solution of the amino-s-triazine containing sufficient mineral acid to dissolve the triazine. The sparingly soluble pentate salt precipitates from the solution as a fine powder or crystalline compound. As an alternative, an acid acceptor such as a tertiary amine may be employed in place of the alkali to promote the hydrolysis reaction. As a third alternative, the amino-s-triazine may be added to the aqueous mixture prior to hydrolysis, whereupon the pentate salt is formed and precipitates as the hydrolysis proceeds. The preparation of pentate salts of amino-s-triazines is more fully described in U.S. Pat. No. 4,154,930.

The amount of flame retardant pentate salt employed will be from about 20 to about 50 wt. percent, preferably from about 30 to about 50 wt. percent, of the total composition. The pentate salts may be employed alone or, more preferably together with a polyol such as for example pentaerythritol, dipentaerythritol or tripentaerythritol to aid in forming char.

The compositions of this invention are flame retardant and intumescent, forming upon combustion a tough, non-burning foamed char surface layer which insulates and protects the substrate from further burning. The char layer additionally appears to prevent dripping of molten resin during combustion.

The compounding of the polymethacrylate with the flame retardant pentate salt may be carried out in any of the conventional compounding processes including Banbury mixing, powder mixing, melt extrusion of the polymethacrylate and the flame retardant components, milling the components together on a roll mill and the like. The composition may further include such additives as plasticizers, heat and light stabilizers, antioxidants, pigments, dyes and the like as is commonly practiced in the compounding art.

The following examples are provided to illustrate the practice of this invention.

EXAMPLES 1-6

In the following Examples, summarized in Table I, compositions containing poly (methyl methacrylate) and varying levels of melammonium pentate and dipentaerythritol were prepared and tested.

The flame testing was carried out by Underwriters Laboratory Test method UL 94, Vertical Burn Method.

The Limiting Oxygen Index test method or LOI, described in ASTM 2863-74, is a further method for rating flammability. The flammability decreases with increase in LOI value.

The compounding was carried out by first drymixing the additive components with the polymethacrylate then melt-mixing the composition using a Brabender mixing head fitted with rollerblades for 5 min. at 80 rpm. The blend was then compression-molded to form a slab, which was cut into test bars. The test data for the various compositions are summarized in Table I.

TABLE I

| Ex. No. | 1 | 2 | 3 | 4 | 5 | 6 |
|---|---|---|---|---|---|---|
| Component[1] | | | | | | |
| Polymethyl methacrylate | 100 | 100 | 100 | 100 | 100 | 100 |
| Melammonium pentate | — | 50 | 40 | 27.6 | 28.5 | 30 |
| Dipentaerythritol | — | 5 | 4 | 3 | 1.5 | 0 |
| FR Additive, WT. % | — | 35.5 | 31 | 23.5 | 23.1 | 23.1 |
| UL Rating | NVE | V-O | V-O | NVE | NVE | NVE |
| LOI | 17.3[2] | 39.5 | 32.5 | 31.6 | 25.5 | 26.5 |

Notes:
[1]Components of formulation in parts by weight
[2]Published value, SPE Journal 27 17 (1971)

It will be apparent that polymethyl methacrylate is made flame retardant by the addition of as little as 30 wt.% melammonium pentate (compare Example 1 with Examples 2 and 3). At levels below about 30wt.%, Examples 4-6, the compositions are flame retardant as shown by the LOI values, and intumescent, but not vertically self-extinguishing.

The invention will thus be seen to be compositions comprising a thermoplastic polymethacrylate and a flame-retarding amount of the pentate salt of an amino-s-triazine, said salt being selected from the group melammonium pentate, the pentate salt of ammelide and mixtures thereof, wherein the amount of said salt will be from about 20 to about 50 percent by weight of the total composition, and a method for rendering thermoplastic polymethacrylates intumescent and self-extinguishing.

Further modifications including the use of dyes, pigments, fillers, stabilizers and the like will be apparent to those skilled in the art, and such additives and modifications may be made without departing from the spirit and scope of the invention, which is defined solely by the following claims.

I claim:

1. Thermoplastic polymethacrylate compositions comprising (a) thermoplastic polymethacrylate, (b) a flame retarding amount of an intumescent additive selected from the group consisting of melammonium pentate, the pentate salt of ammelide, and mixtures thereof, and (c) a polyol.

2. The composition of claim 1 wherein the intumescent additive is present in from about 20 to about 50 percent by weight of the total composition.

3. The composition of claim 1 wherein the polymethacrylate is poly (methyl methacrylate).

4. The composition of claim 1 wherein said additive is melammonium pentate.

5. The composition of claim 1 wherein said additive is melammonium pentate and the polyol is dipentaerythritol.

6. A method for rendering thermoplastic polymethacrylate intumescent and self-extinguishing consisting of compounding therewith from about 20 to about 50 percent by weight based on final composition of an additive selected from the group consisting of melammonium pentate, the pentate salt of ammelide and mixtures thereof, and a polyol selected from the group consisting of pentaerythritol, dipentaerythritol and tripentaerythritol.

* * * * *